United States Patent
Yoshida et al.

(10) Patent No.: US 10,882,237 B2
(45) Date of Patent: Jan. 5, 2021

(54) CUTTING DEVICE AND METHOD FOR OPERATING SAME

(71) Applicant: THE JAPAN STEEL WORKS, LTD., Tokyo (JP)

(72) Inventors: Katsuhiro Yoshida, Kyoto (JP); Kenji Tomomitsu, Hiroshima (JP); Daigo Saga, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 499 days.

(21) Appl. No.: 15/534,749

(22) PCT Filed: Dec. 10, 2015

(86) PCT No.: PCT/JP2015/084697
§ 371 (c)(1),
(2) Date: Jun. 9, 2017

(87) PCT Pub. No.: WO2016/093320
PCT Pub. Date: Jun. 16, 2016

(65) Prior Publication Data
US 2017/0320252 A1    Nov. 9, 2017

(30) Foreign Application Priority Data
Dec. 12, 2014   (JP) ................................. 2014-252456

(51) Int. Cl.
*B29C 48/00*    (2019.01)
*B26D 1/08*    (2006.01)
(Continued)

(52) U.S. Cl.
CPC ............ *B29C 48/0022* (2019.02); *B26D 1/08* (2013.01); *B26D 1/45* (2013.01); *B26D 3/00* (2013.01);
(Continued)

(58) Field of Classification Search
CPC ...................................................... B26D 1/08
See application file for complete search history.

(56) References Cited

U.S. PATENT DOCUMENTS 2,002,374 A  *  5/1935  King .................... B26D 5/34
                                                226/30
5,226,335 A  *  7/1993  Sitte .................... G01N 1/06
                                                83/703

(Continued)

FOREIGN PATENT DOCUMENTS

CN         1958260 A      5/2007
CN       102233961 A     11/2011
(Continued)

OTHER PUBLICATIONS

International Search Report dated Feb. 23, 2016, issued by the International Searching Authority in counterpart International Application No. PCT/JP2015/084697 (PCT/ISA/210).
(Continued)

*Primary Examiner* — Peter L Vajda
*Assistant Examiner* — Caroline Montiel
(74) *Attorney, Agent, or Firm* — Sughrue Mion, PLLC

(57) ABSTRACT

A first connecting portion (31) and a second connecting portion (33) slide over a first guide link (17) and a second guide link (19), respectively, when an operation point (OP) of a reciprocating linear motion mechanism (38) moves from an initiating position to a terminating position. A second acute angle ($\theta 2$) formed between the second guide link (19) and a supporting surface (15) is greater than a first acute angle ($\theta 1$) formed between the first guide link (17) and the supporting surface (15).

12 Claims, 4 Drawing Sheets

(51) Int. Cl.
*B29B 9/14* (2006.01)
*B26D 5/18* (2006.01)
*B29C 48/355* (2019.01)
*B26D 1/45* (2006.01)
*B26D 3/00* (2006.01)
*B26D 3/16* (2006.01)
*B29K 77/00* (2006.01)
*B29K 307/04* (2006.01)

(52) U.S. Cl.
CPC ................. *B26D 3/16* (2013.01); *B26D 5/18* (2013.01); *B29B 9/14* (2013.01); *B29C 48/355* (2019.02); *B29C 2793/0027* (2013.01); *B29K 2077/00* (2013.01); *B29K 2307/04* (2013.01)

(56) References Cited

U.S. PATENT DOCUMENTS

| | | | | | |
|---|---|---|---|---|---|
| 5,582,088 | A | * | 12/1996 | Harter | B23D 45/024 83/468.4 |
| 5,658,229 | A | * | 8/1997 | Armington | B26D 1/30 493/363 |
| 5,771,766 | A | * | 6/1998 | Vedders | B26D 1/08 83/241 |
| 6,715,392 | B2 | * | 4/2004 | Zscheile | B26D 7/0006 83/638 |
| 2009/0202829 | A1 | * | 8/2009 | Fox | B29B 9/14 428/375 |
| 2011/0271812 | A1 | | 11/2011 | Maier et al. | |
| 2013/0279963 | A1 | * | 10/2013 | Shida | B26D 1/08 400/621 |

FOREIGN PATENT DOCUMENTS

| | | | | |
|---|---|---|---|---|
| CN | 102729272 | A | 10/2012 | |
| DE | 213 684 | C | 12/1908 | |
| EP | 0 606 045 | A1 | 7/1994 | |
| EP | 0606045 | B1 * | 10/1996 | ........... B23Q 1/4804 |
| JP | 6-5925 | U | 1/1994 | |
| JP | H8-47894 | A | 2/1996 | |
| JP | H8-174480 | A | 7/1996 | |
| JP | 2006-88248 | A | 4/2006 | |
| JP | 2011-115861 | A | 6/2011 | |
| JP | 4977977 | B2 | 7/2012 | |
| JP | 2014-188614 | A | 10/2014 | |
| WO | 2010084579 | A1 | 7/2010 | |
| WO | WO-2010084579 | A1 * | 7/2010 | ............. B23D 15/08 |
| WO | 2011/064965 | A1 | 6/2011 | |

OTHER PUBLICATIONS

Written Opinion dated Feb. 23, 2016, issued by the International Searching Authority in counterpart International Application No. PCT/JP2015/084697 (PCT/ISA/237).
Communication dated Jul. 2, 2018, issued by the European Patent Office in counterpart European Application No. 15866479.7.
Communication dated Dec. 18, 2018, from the Japanese Patent Office in counterpart application No. 2014-252456.
Office Action dated Apr. 16, 2019 by the Japanese Patent Office in counterpart Japanese Patent Application No. 2014-252456.
Communication dated Jun. 4, 2018 issued by the State Intellectual Property Office of P.R. China in counterpart Chinese Patent Application No. 201580067603.6.

* cited by examiner

[FIG.1]
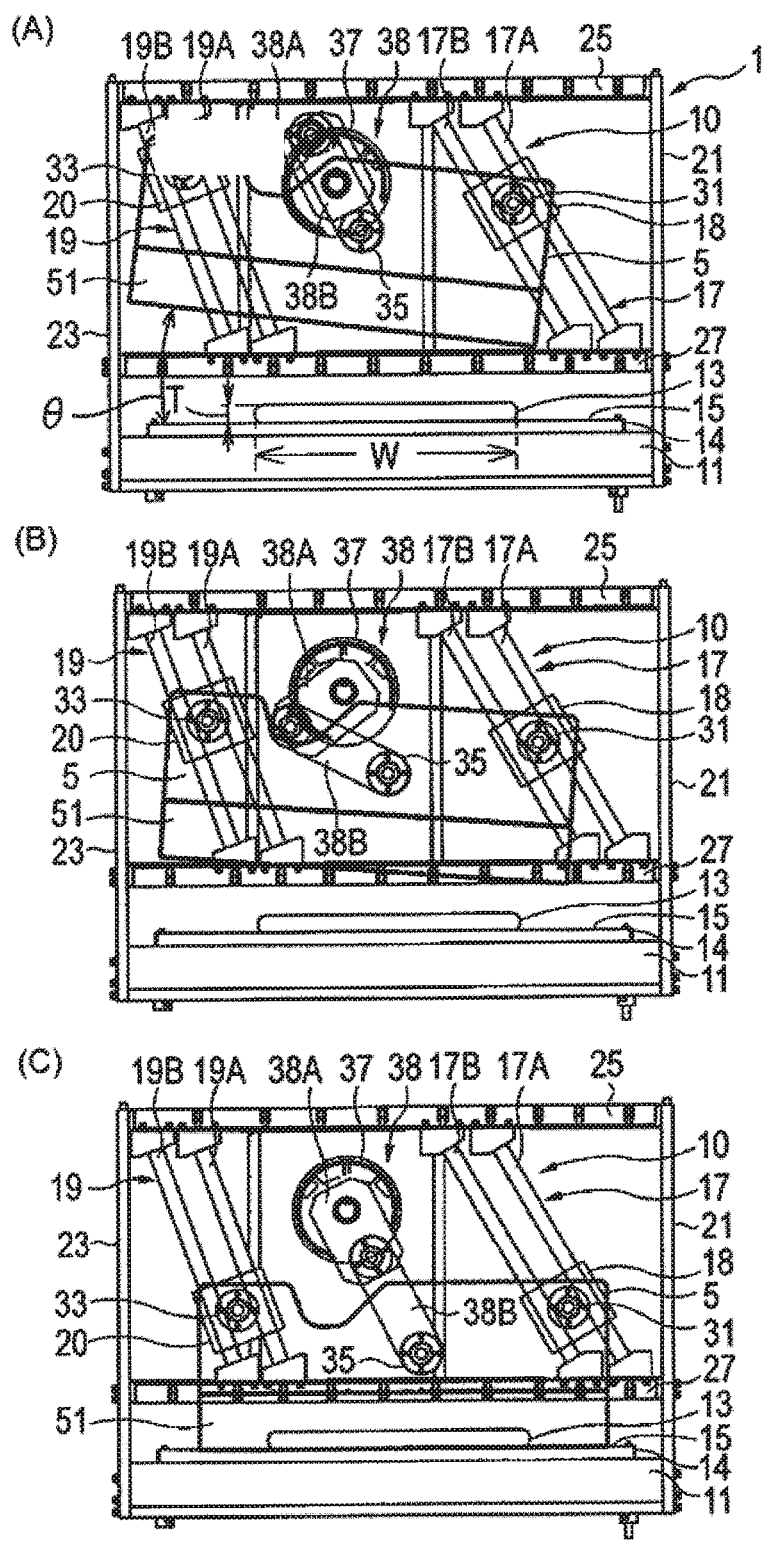

[FIG.2]
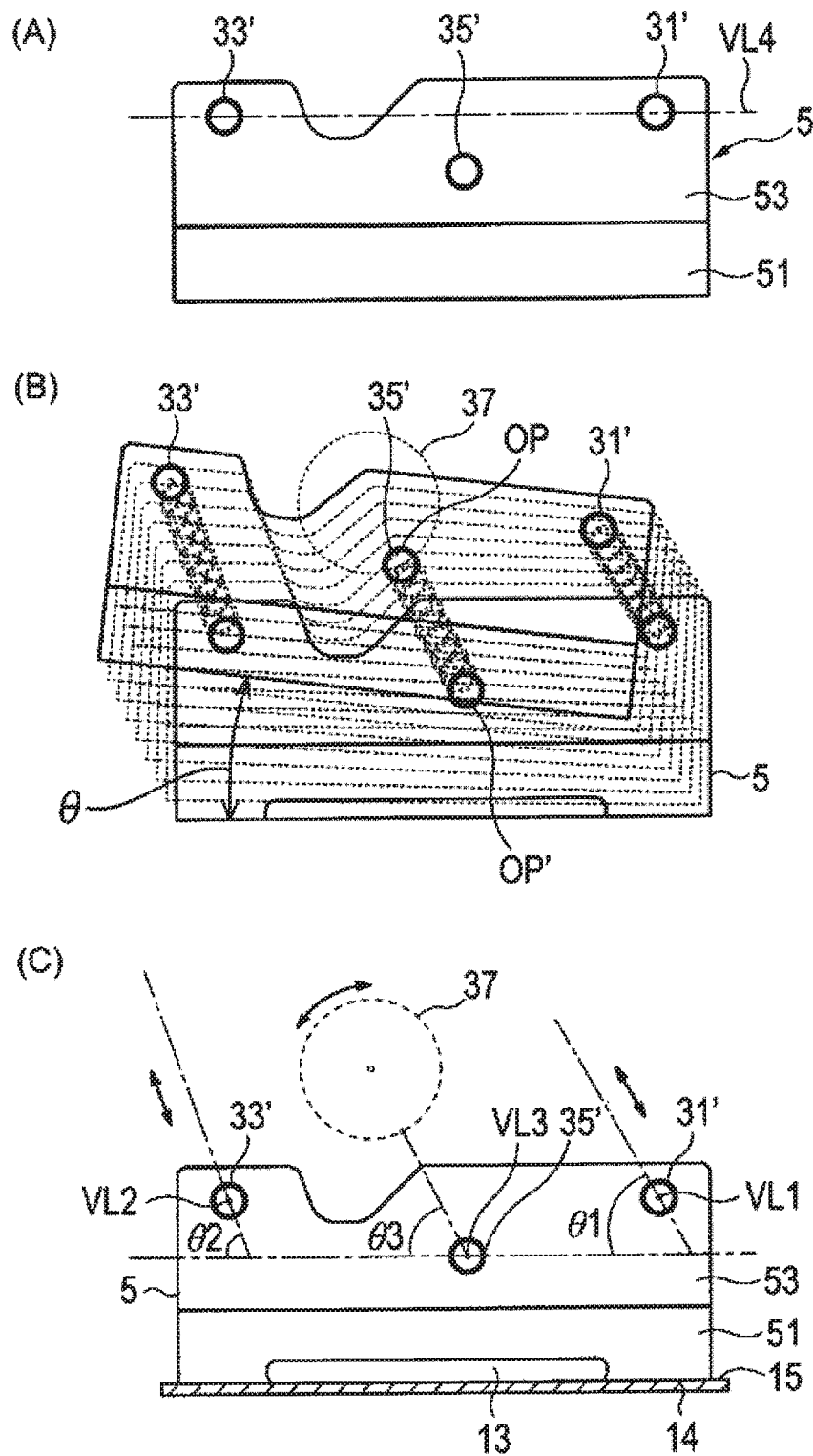

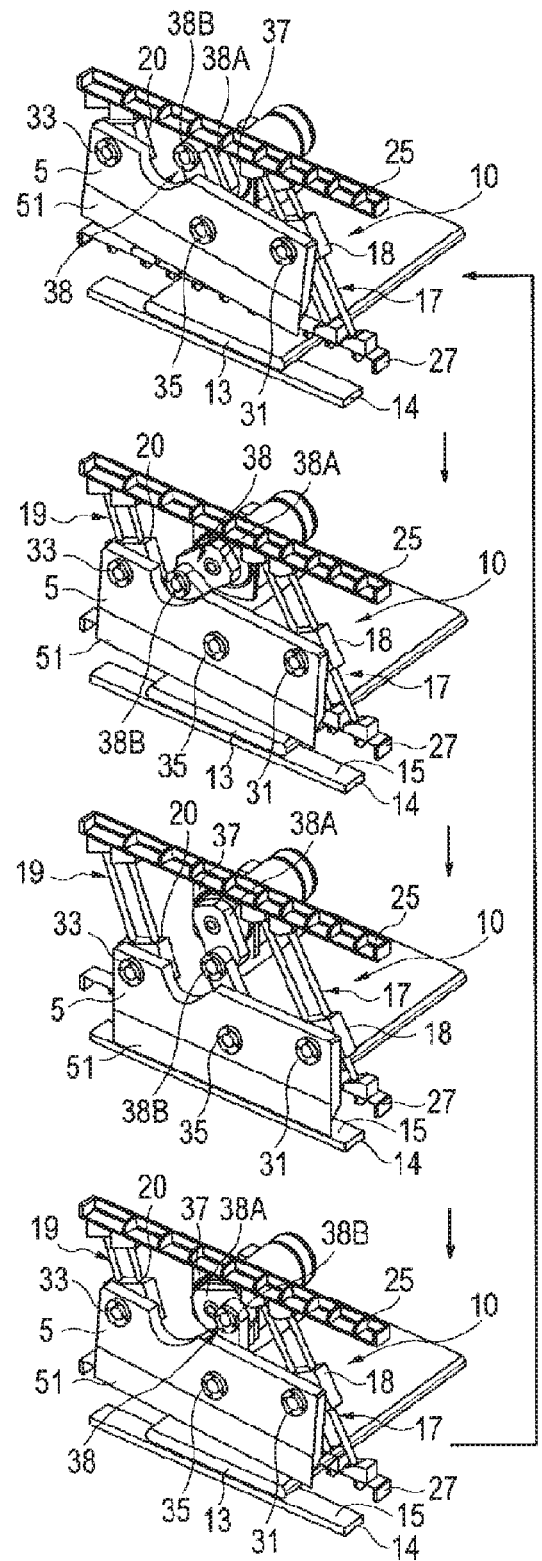
[FIG.3]

[FIG.4]
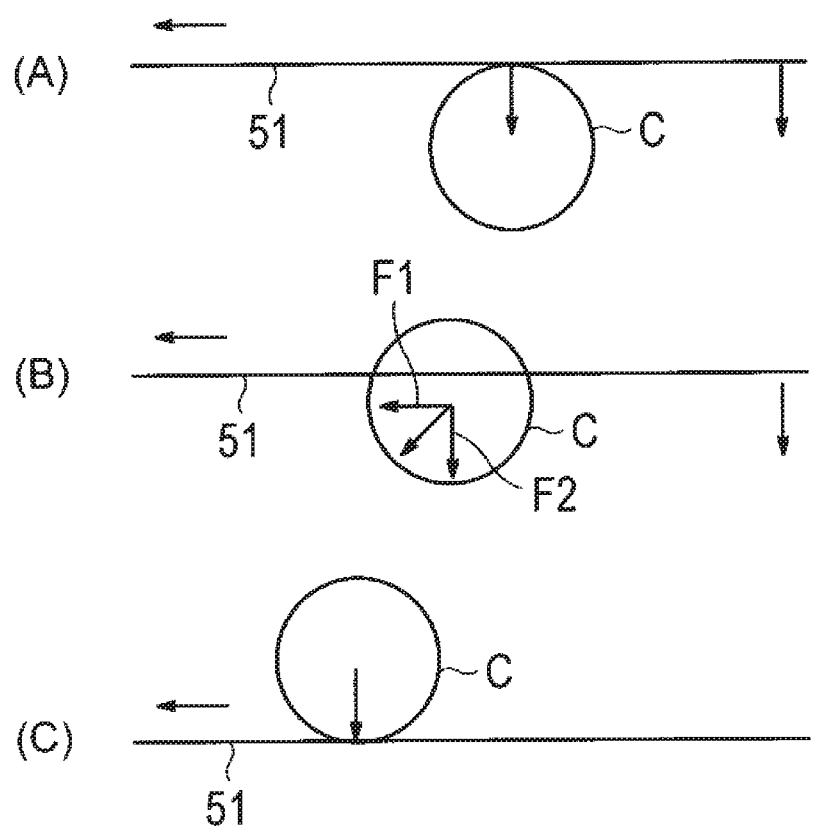

CUTTING DEVICE AND METHOD FOR OPERATING SAME

TECHNICAL FIELD

The present invention relates to a cutting apparatus for cutting a material which moves on a supporting surface to be cut and its operation method. A reinforcement fiber such as carbon fiber, glass fiber or the like is kneaded together with a thermoplastic resin while being heated so as to be formed into a reinforcement fiber containing kneaded material having fluidity, which is then extruded continuously from an extruding machine in the form of a long extruded reinforcement fiber containing kneaded material. Then, the invention relates particularly to a cutting apparatus for cutting such a long extruded reinforcement fiber containing kneaded material which is extruded from the extruding machine to be conveyed on the supporting surface into a predetermined length of extruded reinforcement fiber containing kneaded material before the thermoplastic resin is hardened and its operation method.

BACKGROUND ART

Japanese Patent Publication No. 4977977 (PTL 1) discloses a configuration of a related-art cutting apparatus which cuts a workpiece such as a diary or documentation of a certain number of stacked sheets into two halves. This cutting apparatus includes an edged tool control mechanism for operating an edged tool so as to cut a workpiece while changing the posture of the edged tool from an inclined posture to a horizontal posture by swinging the edged tool in a horizontal direction. Specifically, this edged tool control mechanism has the following configuration. An edged tool holder is supported pivotally at the front and rear thereof by two arms having different lengths so as to be held in a hanging manner so that the edged tool can take an inclined posture. Then, the link arms are pivotally supported on the edged tool holder, and an L-shaped arm, which is pivotally supported on a lifting portion of a lift mechanism, is connected to the link arms so that the edged tool can swing in association with the lifting portion of the lift mechanism.

JP-A-H8-47894 (PTL 2) also discloses a cutting apparatus in which an edged tool is pivotally supported at the front and rear thereof by two arms so as to be held in a hanging manner so that the edged tool can take an inclined posture, and the two arms, which hold the edged tool in the hanging manner, are oscillated to swing the edged tool.

CITATION LIST

Patent Literature

PTL 1: Japanese Patent No. 4977977
PTL 2: JP-A-H8-47894

SUMMARY OF INVENTION

Technical Problem

In either of the related-art cutting apparatuses, the edged tool is swung by oscillating the two arms. In the configuration in which the two arms are oscillated, however, there is caused a problem that the cutting apparatus is enlarged in size eventually, since a swing space for the two arms has to be secured. Further, for the edged tool to move at high speeds, the parts have to be assembled and worked with high accuracy. In particular, in the event that a material which is being conveyed on a supporting surface to be cut is an extruded reinforcement fiber containing kneaded material which is formed by kneading a reinforcement fiber such as carbon fiber, glass fiber or the like together with a thermoplastic resin while heating so as to form them into a reinforcement fiber containing kneaded material having fluidity and extruding the reinforcement fiber containing kneaded material from an extruding machine into a long extruded reinforcement fiber containing material and that the extruded reinforcement fiber containing kneaded material which is extruded from the extruding machine is being conveyed on the supporting surface, the following problem is caused. Namely, since the extruded reinforcement fiber containing kneaded material is cut while being compressed and the strength of the reinforcement fiber is high, in case the moving speed of the edged tool is slow, the edged tool is pushed strongly in the moving direction of the reinforcement fiber containing kneaded material by the reinforcement fiber containing kneaded material. This causes relatively great stress to act on the edged tool to thereby deteriorate the edged tool, leading to a problem that the service life of the edged tool becomes short.

An object of the invention is to provide a cutting apparatus and its operation method which can allow a cutting edged tool to swing without enlarging the size of a cutting edged tool moving mechanism and increase a moving speed of the cutting edged tool.

The above object of the invention can be achieved by the following configurations.

(1) A cutting apparatus for cutting an extruded reinforcement fiber containing kneaded material, which has been extruded from an extruding machine and is being moved on a supporting surface, into a predetermined length before a thermoplastic resin is hardened, wherein the extruded reinforcement fiber containing kneaded material is continuously formed by extruding a reinforcement fiber containing kneaded material having fluidity, which has been formed by kneading the thermoplastic resin together with a reinforcement fiber while heating, in an elongated form from the extruding machine, the cutting apparatus comprising:

a cutting edged tool moving mechanism for moving a cutting edged tool having a plate shape and including a blade on an edge portion thereof from a first position, which is located away from the supporting surface and above the extruded reinforcement fiber containing kneaded material, to a second position, at which the blade comes into contact with the supporting surface, and then moving back the cutting edged tool from the second position to the first position so as to cut the extruded reinforcement fiber containing kneaded material which is being moved on the supporting surface with the cutting edged tool, wherein the cutting edged tool moving mechanism comprises:

a first guide link that forms a first guide path extending to form a first acute angle relative to the supporting surface;

a second guide link, which is disposed spaced away in a surface direction of the supporting surface from the first guide link, and which forms a second guide path extending to form a second acute angle, which is greater than the first acute angle, relative to the supporting surface;

a first connecting portion, which is fixed to the cutting edged tool to form a rotational pair rotatable about a first imaginary line intersecting a plate surface of the cutting edged tool at right angles, and which forms a sliding pair with the first guide link;

a second connecting portion, which is fixed to the cutting edged tool to form a rotational pair rotatable about a second imaginary line intersecting the plate surface of the cutting edged tool at right angles, and which forms a sliding pair with the second guide link;

a reciprocating linear motion mechanism whose operation point moves linearly in a reciprocating motion between an initiating position and a terminating position by means of power from a power source and a third connecting portion that connects the cutting edged tool and the operation point of the reciprocating linear motion mechanism together so as to form a rotational pair rotatable about a third imaginary line intersecting the plate surface of the cutting edged tool at right angles, and wherein the first acute angle, the second acute angle and a positional relationship among the first connecting portion to the third connecting portion are set to form an angle between the blade and the supporting surface when the operation point of the reciprocating linear motion mechanism stays in the initiating position and the blade of the cutting edged tool stays in the first position, and to gradually reduce the angle between the blade and the supporting surface with the blade sliding on the supporting surface in the surface direction of the supporting surface and compressing the extruded reinforcement containing kneaded material, which is being moved, in a process in which the cutting edged tool moves towards the second position from the first position as a result of the operation point of the reciprocating linear motion mechanism moving from the initiating position to the terminating position.

(2) A cutting apparatus for cutting a material which is being moved on a supporting surface to be cut, the cutting apparatus comprising:

a cutting edged tool moving mechanism for moving a cutting edged tool having a plate shape and including a blade on an edge portion thereof from a first position, which is located away from the supporting surface and above the material to be cut, to a second position, at which the whole blade comes into contact with the supporting surface, and then moving back the cutting edged tool from the second position to the first position so as to cut the material to be cut which is being moved on the supporting surface, wherein the cutting edged tool moving mechanism comprises:

a first guide link that forms a first guide path extending to form a first acute angle relative to the supporting surface;

a second guide link, which is disposed spaced away in a surface direction of the supporting surface from the first guide link, and which forms a second guide path extending to form a second acute angle, which is greater than the first acute angle, relative to the supporting surface;

a first connecting portion, which is fixed to the cutting edged tool to form a rotational pair rotatable about a first imaginary line intersecting a plate surface of the cutting edged tool at right angles, and which forms a sliding pair with the first guide link;

a second connecting portion, which is fixed to the cutting edged tool to form a rotational pair rotatable about a second imaginary line intersecting the plate surface of the cutting edged tool at right angles, and which forms a sliding pair with the second guide link;

a reciprocating linear motion mechanism whose operation point moves linearly in a reciprocating motion between an initiating position and a terminating position by means of power from a power source; and a third connecting portion that connects the cutting edged tool and the operation point of the reciprocating linear motion mechanism together so as to form a rotational pair rotatable about a third imaginary line intersecting the plate surface of the cutting edged tool at right angles, and wherein the first acute angle, the second acute angle and a positional relationship among the first connecting portion to the third connecting portion are set to form an angle between the blade and the supporting surface when the operation point of the reciprocating linear motion mechanism stays in the initiating position and the blade of the cutting edged tool stays in the first position, and to gradually reduce the angle between the blade and the supporting surface with the blade sliding on the supporting surface in the surface direction of the supporting surface in a process in which the cutting edged tool moves towards the second position from the first position as a result of the operation point of the reciprocating linear motion mechanism moving from the initiating position to the terminating position.

(3) The cutting apparatus according to the above (1), wherein a third acute angle $\theta 3$ that is formed between a motion locus, which connects the initiating position and the terminating position, and the supporting surface is greater than the first acute angle $\theta 1$ and is smaller than the second acute angle $\theta 2$.

(4) The cutting apparatus according to the above (3), wherein the first acute angle $\theta 1$, the second acute angle $\theta 2$ and the third acute angle $\theta 3$ are set to allow the blade to stay in the second position with coming into contact with the supporting surface entirely when the operation point of the reciprocating linear motion mechanism reaches the terminating position.

(5) The cutting apparatus according to any one of the above (1) to (4), wherein the blade of the cutting edged tool has a single cutting edge.

(6) The cutting apparatus according to the above (1), wherein the reinforcement fiber is a carbon fiber, the thermoplastic resin is a polyamide resin, the first acute angle $\theta 1$ is in the range of 50 degrees to 60 degrees, and the second acute angle $\theta 2$ is in the range of 70 degrees to 80 degrees.

(7) The cutting apparatus according to the above (1) or (2), wherein in a case where the blade is a linear blade, the first connecting portion and the second connecting portion are located on an imaginary straight line that is parallel to the linear blade, and the third connecting portion is located between the first connecting portion and the second connecting portion and between the linear blade and the imaginary straight line.

(8) An operation method for the cutting apparatus according to the above (1), wherein the reciprocating linear motion mechanism causes the cutting edged tool to reciprocate at an average speed that is five or more times faster than a moving speed of the extruded reinforcement fiber containing kneaded material which is being conveyed on the supporting surface to cut the extruded reinforcement fiber containing kneaded material.

Solution to Problem

When used to cut, for example, a long extruded reinforcement fiber containing kneaded material which is formed by extruding continuously from an extruding machine a reinforcement fiber containing kneaded material having fluidity which is formed by kneading a reinforcement fiber such as carbon fiber, glass fiber or the like together with a thermoplastic resin while heating, the cutting apparatus of the invention provides the following advantageous effect. Namely, the cutting apparatus of the invention provides a superior advantageous effect that the cutting edged tool is allowed to swing to move at high speeds on the extruded reinforcement fiber containing kneaded material (a material to be cut) which is extruded from the extruding machine to be conveyed on the supporting surface without enlarging the size of the tool moving mechanism of the cutting apparatus.

The cutting apparatus of the invention includes the cutting edged tool moving mechanism for moving the plate-shaped cutting edged tool having the blade on the edge portion thereof from the first position which is located away from the supporting surface and above the material to be cut to the second position where the blade comes into contact in whole with the supporting surface and thereafter moving back the cutting edged tool from the second position to the first position to thereby cut the material to be cut which is now being conveyed on the supporting surface. In particular, the cutting edged tool moving mechanism includes the first guide link for forming the first guide path which extends so as to form the first acute angle relative to the supporting surface, the second guide link which is disposed spaced away in the surface direction of the supporting surface from the first guide link and which forms the second guide path which extends so as to form the second acute angle which is greater than the first acute angle. Further, the cutting edged tool moving mechanism includes the first connecting portion which is fixed to the cutting edged tool so as to form the rotational pair which rotates about the first imaginary line which intersects the plate surface of the cutting edged tool at right angles and which forms the sliding pair with the first guide link. The cutting edged tool moving mechanism includes the second connecting portion which is fixed to the cutting edged tool so as to form the rotational pair which rotates about the second imaginary line which intersects the plate surface of the cutting edged tool at right angles and which forms the sliding pair with the second guide link. The cutting edged tool moving mechanism includes the reciprocating linear motion mechanism whose operation point moves linearly in the reciprocating motion between the initiating position and the terminating position by means of power from the power source and the third connecting portion which connects the cutting edged tool and the operation point of the reciprocating linear motion mechanism together so as to form the rotational pair which rotates about the third imaginary line which intersects the plate surface of the cutting edged tool at right angles. Then, in this invention, the first acute angle $\theta 1$ and the second acute angle $\theta 2$ and the positional relationship among the first connecting portion to the third connecting portion are determined so that when the operation point of the reciprocating linear motion mechanism stays in the initiating position and the blade of the cutting edged tool stays in the first position, the angle is formed between the blade and the supporting surface and in the process in which the cutting edged tool moves towards the second position from the first position as a result of the operation point of the reciprocating linear motion mechanism moving from the initiating position to the terminating position, the blade slides on the supporting surface in the surface direction of the supporting surface and the angle formed between the blade and the supporting surface is gradually reduced (ideally, the angle becomes 0).

According to the invention, the first connecting portion and the second connecting portion slide over the first guide link and the second guide link, respectively, when the operation point of the reciprocating linear motion mechanism moves from the initiating position to the terminating position. When the first connecting portion and the second connecting portion slide in the way described above, the first guide link and the second guide link do not oscillate, and the cutting edged tool can be caused to swing without increasing the dimensions of the cutting edged tool moving mechanism. In addition, the first to the third connecting portions only move linearly, and therefore, the cutting edged tool can move at high speeds, whereby the cutting edged tool can cut the moving material to be cut without receiving any great force from the moving material to be cut. As a result, the deterioration of the cutting edged tool is suppressed, thereby making it possible to extend the service life of the cutting edged tool. In addition, the following state results from making the second acute angle $\theta 2$ at which the second guide link is inclined relative to the supporting surface greater than the first acute angle $\theta 1$ at which the first guide link is inclined relative to the supporting surface. The blade of the cutting edged tool moves from the posture in which the blade is inclined so as to form the predetermined angle relative to the supporting surface until the blade comes into contact with the supporting surface or exceeds the supporting surface, and the angle between the blade of the cutting edged tool and the supporting surface is reduced smoothly (towards 0).

It is desirable that the angle (the third acute angle) $\theta 3$ which is formed between the motion locus which connects the initiating position and the terminating position of the reciprocating linear motion mechanism and the supporting surface is greater than the first acute angle $\theta 1$ and is smaller than the second acute angle $\theta 2$. By adopting this configuration, the reciprocating linear motion mechanism can be disposed compact between the first guide link and the second guide link. Specifically, the first acute angle $\theta 1$, the second acute angle $\theta 2$ and the third acute angle $\theta 3$ are determined so that the blade stays in the second position so as to come into contact in whole with the supporting surface when the operation point of the reciprocating linear motion mechanism reaches the terminating position.

In particular, in the event that the reinforcement fiber is the carbon fiber and the thermoplastic resin is the polyamide resin, it is preferable that the first acute angle $\theta 1$ is in the range of 50 degrees to 60 degrees and the second acute angle $\theta 2$ is in the range of 70 degrees to 80 degrees. With this condition met, when the extruded reinforcement fiber containing kneaded material is cut while being compressed, the carbon fiber can be cut in an ensured manner.

The blade of the cutting edged tool may have a single cutting edge or double cutting edges. However, in the case of the material to be cut being the long extruded reinforcement fiber containing kneaded material which is formed by extruding the reinforcement fiber containing kneaded material having the fluidity which is formed by kneading the reinforcement fiber such as carbon fiber, glass fiber or the like together with the thermoplastic resin while heating from the extruding machine, it is preferable that the blade has the single cutting edge. This is because an advantageous effect can be obtained that cutting reinforcement fiber with the single cutting edge can ensure that a moving material to be cut can be cut.

When the blade is the linear blade, it is preferable that the first connecting portion and the second connecting portion are located on the imaginary straight line which is parallel to the linear blade and that the third connecting portion is located between the first connecting portion and the second connecting portion and between the linear blade and the imaginary straight line. In case the positional relationship among the first connecting portion to the third connecting portion is determined in the way described above, the overall dimensions of the cutting edged tool moving mechanism can be made compact.

In the operation method for the cutting apparatus according to the invention, the reciprocating linear motion mechanism causes the cutting edged tool to reciprocate at the average speed which is five or more times faster than the moving speed of the extruded reinforcement fiber containing kneaded material which is being conveyed on the supporting surface to cut the extruded reinforcement fiber containing kneaded material. By causing the cutting edged tool to move at the speed described above, the force that the cutting edged tool receives from the moving extruded reinforcement fiber containing kneaded material can be reduced to such an extent that the deterioration of the blade of the cutting edged tool can be suppressed.

BRIEF DESCRIPTION OF DRAWINGS

FIGS. 1(A) to 1(C) are front views of a cutting apparatus according to an embodiment of the invention showing a configuration of the cutting apparatus and movements of a cutting edged tool moving mechanism in time series.

FIG. 2(A) is a front view of a cutting edged tool, and FIGS. 2(B) and 2(C) are drawings which illustrate a relationship in movement between the cutting edged tool of the cutting edged tool moving mechanism used in the embodiment shown in FIG. 1 and a power source.

FIG. 3 shows a series of movements of the cutting edged tool moving mechanism used in the embodiment.

FIGS. 4(A) to 4(C) are drawings used to explain a cutting situation by paying attention to a single carbon fiber.

DESCRIPTION OF EMBODIMENTS

Hereinafter, referring to the drawings, an embodiment of a cutting apparatus and its operation method of the invention will be described in detail. FIGS. 1(A) to 1(C) are front views of a cutting apparatus 1 according to an embodiment of the invention showing the configuration of the cutting apparatus 1 and movements of a cutting edged tool moving mechanism 10 in time series. To facilitate the understanding of a description to be made below, a cutting edged tool 5 and the like are depicted as being transparent. FIG. 2(A) is a front view of the cutting edged tool 5, and FIGS. 2(B) and 2(C) are drawings to be used to illustrate a relationship in movement between the cutting edged tool 5 of the cutting edged tool moving mechanism 10 used in the embodiment shown in FIG. 1 and a power source 37. Then, FIG. 3 shows a series of movements of the cutting edged tool moving mechanism 10 used in the embodiment. In these drawings, a material to be cut by the cutting apparatus 1 of the embodiment is a long extruded reinforcement fiber containing kneaded material 13 which is formed by extruding from an extruding machine a reinforcement fiber containing kneaded material having fluidity which is formed by kneading a reinforcement fiber such as carbon fiber, glass fiber or the like together with a thermoplastic resin which is formed of a polyimide resin which contains nylon while heating. A thickness T of this extruded reinforcement fiber containing kneaded material 13 is, for example, in the range of 5 cm to 7 cm, and a width W thereof is in the range of 80 Cm to 100 cm. In the extruded reinforcement fiber containing kneaded material 13 which has just been extruded from the extruding machine, the thermoplastic resin has not been hardened yet, and therefore, when pressed with strong force, the extruded reinforcement fiber containing kneaded material 13 is compressed to be deformed like an agar which is an edible gelatinous material. However, the reinforcement fiber such as carbon fiber is not cut easily, and hence, some device needs to be thought out to cut the reinforcement fiber. The cutting apparatus of this embodiment is suitable for cutting such a special material which is moving or being conveyed to be cut.

As shown in FIGS. 1(A) to 1(C), the cutting apparatus 1 cuts the extruded reinforcement fiber containing kneaded material 13, which is a material to be cut moving or being conveyed on a supporting surface 15 of a supporting member 14 provided on a base 11, with a plate-shaped cutting edged tool 5 having a blade 51 at an edge thereof while supporting the extruded reinforcement fiber containing kneaded material 13 on the supporting surface 15. The cutting apparatus 1 includes a cutting edged tool moving mechanism 10 which moves the cutting edged tool 5 from a first position (a state shown in FIG. 1(A)) which is located away from the supporting surface 15 and above the material to be cut (13) towards a second position (a state shown in FIG. 1(C)) where the blade 51 is located on the supporting surface 15 in whole and then moves back the cutting edged tool 5 from the second position to the first position. In this embodiment, the supporting member 14 is placed on the base 11, so that cutting is performed with a material to be cut slightly raised, whereby the material to be cut can be cut in an ensured manner with the cutting edged tool 5 which can now be pushed down with a reduced push-down force. On the other hand, the supporting member 14 may not be provided, in which case a surface of the base 11 can be used as the supporting surface 15.

The cutting edged tool moving mechanism 10 includes a first guide link 17 which forms a first guide path which extends so as to form a first acute angle θ1 (refer to FIG. 2(C)) relative to the supporting surface 15, The cutting edged tool moving mechanism 10 includes additionally a second guide line 19 which is disposed so as to be spaced away from the first guide link 17 in a surface direction of the supporting surface 15 and which forms a second guide path which extends so as to form a second acute angle θ2 (refer to FIG. 2(C)), which is greater than the first acute angle θ1, relative to the supporting surface 15. The first guide link 17 is made up of two guide bars 17A and 17B. The two guide bars 17A and 17B are fixed individually to two horizontal frames 25 and 27 which are fixed to two vertical frames 21 and 23 at both ends thereof. A slider 18 is provided on the two guide bars 17A and 17B so as to slide thereover while straddling them. Similarly, the second guide link 19 is made up of two guide bars 19A and 19B. The two guide bars 19A and 19B are fixed individually to the two horizontal frames 25 and 27 which are fixed to the two vertical frames 21 and 23 at both ends thereof. A slider 20 is provided on the guide bars 19A and 19B so as to slide thereover while straddling them. The sliders 18 and 20 can be guided in a stablest state by using the two guide bars 17A and 17B (19A and 19B).

As shown in FIG. 2(C), the cutting edged tool moving mechanism 10 includes a first connecting portion 31 (refer to FIGS. 1(A) to 1(C) and 3) which is fixed to the cutting edged tool 5 so as to form a rotational pair which rotates about a first imaginary line VL1 which intersects with a plate surface 53 of the cutting edged tool 5 at right angles and which forms a sliding pair with the first guide link 17. Additionally, the cutting edged tool moving mechanism 10 includes a second connecting portion 33 (refer to FIGS. 1(A) to 1(C) and 3) which is fixed to the cutting edged tool 5 so as to form a rotational pair which rotates about a second imaginary line VL2 (FIG. 2(C)) which intersects the plate surface 53 of the cutting edged tool 5 at right angles and which forms a sliding pair with the second guide link 19. Further, the cutting edged tool moving mechanism 10 includes a reciprocating linear motion mechanism 38 whose operation point OP moves linearly in a reciprocating motion between an initiating point and a terminating point by means of power from an electric motor 37 functioning as a drive source and a third connecting portion 35 which connects the cutting edged tool 5 and the operation point OP of the reciprocating linear motion mechanism 38 so as to form a rotational pair which rotates about a third imaginary line VL3 (FIG. 2(C)) which intersects the plate surface 53 of the cutting edged tool 5 at right angles. In FIG. 2(B), an operation point OP which is denoted by reference characters OP stays in the initiating point, and an operation point OP' which is denoted by reference characters OP' stays in the terminating position. In FIG. 2, reference numerals 31' to 35' are given to through holes in which the first to third connecting portions 31 to 35 are rotatably fitted, respectively.

The operation point OP moves linearly in a reciprocating motion between the initiating position and the terminating position by the rotation of the electric motor 37. The reciprocating linear motion mechanism 38 is made up of a first link 38A which is fixed to a shaft of the electric motor 37 at one end thereof and a second link 38B which is fixed rotatably to the third connecting portion 35 at the other end thereof.

As shown in FIG. 2(A), with the blade 51 made up of a linear blade, the first connecting portion 31 and the second connecting portion 33 are located on an imaginary straight line VL4 which is parallel to the linear blade, and the third connecting portion 35 located between the first connecting portion 31 and the second connecting portion 33 and between the straight blade and the imaginary straight line VL4. In case a positional relationship among the first connecting portion to the third connecting portion is determined in the way described above, overall dimensions of the cutting edged tool moving mechanism can be made compact.

In this embodiment, when the operation point OP of the reciprocating linear motion mechanism 38 stays in the initiating position and the blade 51 of the cutting edged tool 5 stays in the first position (a position where the blade 51 stays on a left side as viewed in FIGS. 1(A) and 3), an angle θ which is formed between the blade 51 and the supporting surface 15 becomes an acute angle. The blade 51 slides on the supporting surface 15 in a surface direction of the supporting surface 15 in a process in which the cutting edged tool 5 moves towards the second position (a position where the blade 51 stays on a right side as viewed in FIGS. 1(C) and 3) from the first position (the position where the blade 51 stays on the left side as viewed in FIGS. 1(A) and 3) as a result of the operation point OP of the reciprocating linear motion mechanism 38 moving from the initiating position to the terminating position. The first acute angle θ1 and the acute angle θ2 and the positional relationship among the first connecting portion 31 to the third connecting portion 35 are determined so that the angle θ formed between the blade 51 and the supporting surface 15 becomes smaller gradually as the blade 51 slides on the supporting surface 15 in the way described above. In this embodiment, a third acute angle θ3 formed between a motion locus of the reciprocating linear motion mechanism 38 and the supporting surface 15 is determined so that θ1<θ3<θ2.

According to this embodiment, the first connecting portion 31 and the second connecting portion 33 (the first slider 18 and the second slider 20) slide over the first guide link 17 and the second guide link 19, respectively, when the operation point OP of the reciprocating linear motion mechanism 38 moves from the initiating position (a position where the operation point OP stays on the left side as viewed in FIGS. 1(A) and 3) to the terminating position (a position where the operation point OP stays on the right side as viewed in FIGS. 1(C) and 3). When the first connecting portion 31 and the second connecting portion 33 slide in the way described above, the blade 51 of the cutting edged tool 5 moves while being guided at both ends thereof in an ensured manner without oscillation of the first guide link 17 and the second guide link 19. As a result, a substantially uniform force can be applied to portions of the blade 51 by the force applied from the reciprocating linear motion mechanism 38. In addition, the following state results from making the second acute angle θ2 at which the second guide link 19 is inclined relative to the supporting surface 15 greater than the first acute angle θ1 at which the first guide link 17 is inclined relative to the supporting surface 15. Namely, the blade 51 of the cutting edged tool 5 moves from a posture in which the blade 51 is inclined so as to form a predetermined angle θ relative to the supporting surface 15 until the blade 51 comes into contact in whole with the supporting surface 15 or exceeds the supporting surface 15, and the angle θ between the blade 51 of the cutting edged tool 5 and the supporting surface 15 is reduced smoothly (to 0).

The blade 51 of the cutting edged tool 5 may have a single cutting edge or double cutting edges. In this embodiment, however, a blade having a single cutting edge is adopted for the blade 51. Being different from this embodiment, in the event that a configuration is adopted in which another blade is disposed in a position opposite to the blade 51 so as to hold a material to be cut (13) therebetween so that the material to be cut is cut from both sides thereof, there appears a phenomenon in which a portion of the moving material to be cut is torn to remain between the two blades, which is not preferable.

In addition, as shown in FIG. 2(C), it is preferable that the first acute angle θ1 of the first guide link 17, the second acute angle θ2 of the second guide link 19 and the third acute angle θ3 satisfy the relationship of θ1<θ3<θ2. Specifically, the first acute angle θ1, the second acute angle θ2 and the third acute angle θ3 are determined so that the blade 51 is located in the second position so as to come into contact in whole with the supporting surface 15 when the operation point of the reciprocating linear motion mechanism 38 reaches the terminating point. In the event that those acute angles are determined in the way described above, as shown in FIG. 2(B), the first connecting portion 31 and the second connecting portion 33 each move linearly in a smooth fashion.

In particular, in the case where the reinforcement fiber is carbon fiber and the thermoplastic resin is a polyamide resin such as nylon, it is preferable that the first acute angle θ1 is in the range of 50 degrees to 60 degrees and the second acute angle θ2 is in the range of 70 degrees to 80 degrees. With this condition met, the carbon fiber can be cut in an ensured manner when the extruded reinforcement fiber containing kneaded material 13, which is moving or being conveyed on the supporting surface 15, is cut while being compressed. According to a method of operating the cutting apparatus of this embodiment, the cutting edged tool 5 is caused to reciprocate at an average speed (for example, in the range of 100 mm/sec to 200 mm/sec) which is faster by five or more times than the moving speed of the extruded reinforcement fiber containing kneaded material 13 which is moving at, for example, a speed of 2 to 20 mm/sec on the supporting surface 15 to cut the extruded reinforcement fiber containing kneaded material 13. In the event that a relation in speed like the one described above is adopted between the cutting edged tool 5 and the moving extruded reinforcement fiber containing kneaded material 13, a force which the cutting edged tool 5 receives from the moving extruded reinforcement fiber containing kneaded material 13 can be reduced to such an extent that the deterioration of the blade 51 of the cutting edged tool 5 can be suppressed.

When paying attention to a single strand of carbon fiber C in cutting the reinforcement fiber containing kneaded material 13 which contains carbon fiber with the cutting apparatus of this embodiment, as shown in FIGS. 4(A) to 4(C), in the event that the blade 51 moves so as to reduce the angle θ (refer to FIGS. 1(A) and 2(B)) while sliding, a combined force of a force F1 acting in a sliding direction and a force F2 acting in a push-down direction is applied to the carbon fiber, whereby even the highly strong carbon fiber can be cut with a small force. In this embodiment, a relationship of F2>F1 is maintained from the start to the end of cutting. By adopting this relationship, the blade 51 is allowed to cut into the extruded reinforcement fiber containing kneaded material 13 without the extruded reinforcement fiber containing kneaded material 13 being compressed excessively, thereby making it possible to cut the extruded reinforcement fiber containing kneaded material 13 well.

In the embodiment described heretofore, while the material to be cut is described as being the extruded reinforcement fiber containing kneaded material, the cutting apparatus and its operation method of this embodiment can, of course, be applied to other materials to be cut, provided that they move or are conveyed on the supporting surface and are compressed when they are pressed on by the cutting edged tool.

The invention is not limited to the embodiment but can freely be modified and improved as required. In addition, the materials, shapes, dimensions, numeric values, forms, numbers, locations and the like which are stated in relation to the components are arbitrary and are not limited thereto, provided that the invention can be achieved.

While the invention has been described in detail or by reference to the specific embodiment, it is obvious to those skilled in the art to which the invention pertains that various alterations or modifications can be made thereto without departing from the spirit and scope of the invention.

This patent application is based on Japanese Patent Application (No. 2014-252456) filed on Dec. 12, 2014, the contents of which are incorporated herein by reference.

Here, the characteristics of the embodiment of the cutting apparatus and its operation method of the invention that has been described heretofore will be itemized under [1] to [8] below.

[1] The cutting apparatus (1) for cutting the extruded reinforcement fiber containing kneaded material (13), which has been extruded from the extruding machine and is being moved on the supporting surface (15), into a predetermined length before the thermoplastic resin is hardened, wherein the extruded reinforcement fiber containing kneaded material (13) is continuously formed by extruding the reinforcement fiber containing kneaded material having fluidity, which has been formed by kneading the thermoplastic resin together with the reinforcement fiber while heating, in the elongated form from the extruding machine, the cutting apparatus (1) including:

the cutting edged tool moving mechanism (10) for moving the cutting edged tool (5) having the plate shape and including the blade (51) on the edge portion thereof from the first position, which is located away from the supporting surface (15) and above the extruded reinforcement fiber containing kneaded material (13), to the second position, at which the blade (51) comes into contact with the supporting surface (15), and then moving back the cutting edged tool (5) from the second position to the first position so as to cut the extruded reinforcement fiber containing kneaded material (13) which is being moved on the supporting surface (15) with the cutting edged tool (5), wherein the cutting edged tool moving mechanism (10) includes:

the first guide link (17) that forms the first guide path extending to form the first acute angle (θ1) relative to the supporting surface (15);

the second guide link (19), which is disposed spaced away in the surface direction of the supporting surface (15) from the first guide link (17), and which forms the second guide path extending to form the second acute angle (θ2), which is greater than the first acute angle (θ1), relative to the supporting surface (15);

the first connecting portion (31), which is fixed to the cutting edged tool (5) to form the rotational pair rotatable about the first imaginary line (VL1) intersecting the plate surface of the cutting edged tool (5) at right angles, and which forms the sliding pair with the first guide link;

the second connecting portion (33), which is fixed to the cutting edged tool (5) to form the rotational pair rotatable about the second imaginary line (VL2) intersecting the plate surface of the cutting edged tool (5) at right angles, and which forms the sliding pair with the second guide link;

the reciprocating linear motion mechanism (38) whose operation point (OP) moves linearly in the reciprocating motion between the initiating position and the terminating position by means of power from the power source (the electric motor 37); and the third connecting portion (35) that connects the cutting edged tool (5) and the operation point (OP) of the reciprocating linear motion mechanism (38) together so as to form the rotational pair rotatable about the third imaginary line (VL3) intersecting the plate surface of the cutting edged tool (5) at right angles, and wherein the first acute angle (θ1), the second acute angle (θ2) and the positional relationship among the first connecting portion to the third connecting portion (31, 33, 35) are set to form the angle (θ) between the blade (51) and the supporting surface (15) when the operation point (OP) of the reciprocating linear motion mechanism (38) stays in the initiating position and the blade (51) of the cutting edged tool (5) stays in the first position, and to gradually reduce the angle (θ) between the blade (51) and the supporting surface (15) with the blade (51) sliding on the supporting surface (15) in the surface direction of the supporting surface (15) and compressing the extruded reinforcement containing kneaded material (13), which is being moved, in the process in which the cutting edged tool (5) moves towards the second position from the first position as a result of the operation point (OP) of the reciprocating linear motion mechanism (38) moving from the initiating position to the terminating position.

[2] The cutting apparatus (1) for cutting the material which is being conveyed on the supporting surface (15) to be cut, the cutting apparatus (1) including:

the cutting edged tool moving mechanism (10) for moving the cutting edged tool (5) having the plate shape and including the blade (51) on the edge portion thereof from the first position, which is located away from the supporting surface (15) and above the material to be cut, to the second position, at which the whole blade (51) comes into contact with the supporting surface (15), and then moving back the cutting edged tool (5) from the second position to the first position so as to cut the material to be cut which is being moved on the supporting surface (15), wherein the cutting edged tool moving mechanism (10) includes:

the first guide link (17) that forms the first guide path extending to form the first acute angle (θ1) relative to the supporting surface (15);

the second guide link (19), which is disposed spaced away in the surface direction of the supporting surface (15) from the first guide link (17), and which forms the second guide path extending to form the second acute angle (θ2), which is greater than the first acute angle (θ1), relative to the supporting surface (15);

the first connecting portion (31), which is fixed to the cutting edged tool (5) to form the rotational pair rotatable about the first imaginary line (VL1) intersecting the plate surface of the cutting edged tool (5) at right angles, and which forms the sliding pair with the first guide link (17);

the second connecting portion (33), which is fixed to the cutting edged tool (5) to form the rotational pair rotatable about the second imaginary line (VL2) intersecting the plate surface of the cutting edged tool (5) at right angles, and which forms the sliding pair with the second guide link (19);

the reciprocating linear motion mechanism (38) whose operation point (OP) moves linearly in the reciprocating motion between the initiating position and the terminating position by means of power from the power source (the electric motor 37); and the third connecting portion (35) that connects the cutting edged tool (5) and the operation point (OP) of the reciprocating linear motion mechanism (38) together so as to form the rotational pair rotatable about the third imaginary line (VL3) intersecting the plate surface of the cutting edged tool (5) at right angles, and wherein the first acute angle (θ1), the second acute angle (θ2) and the positional relationship among the first connecting portion to the third connecting portion (31, 33, 35) are set to form the angle (θ) between the blade (51) and the supporting surface (15) when the operation point (OP) of the reciprocating linear motion mechanism (38) stays in the initiating position and the blade (51) of the cutting edged tool (5) stays in the first position, and to gradually reduce the angle (θ) between the blade (51) and the supporting surface (15) with the blade (51) sliding on the supporting surface (15) in the surface direction of the supporting surface (15) in the process in which the cutting edged tool (5) moves towards the second position from the first position as a result of the operation point (OP) of the reciprocating linear motion mechanism (38) moving from the initiating position to the terminating position.

[3] The cutting apparatus (1) according to [1], wherein the third acute angle (θ3) that is formed between the motion locus which connects the initiating position and the terminating position and the supporting surface (15) is greater than the first acute angle (θ1) and is smaller than the second acute angle (θ2).

[4] The cutting apparatus (1) according to [3], wherein the first acute angle (θ1), the second acute angle (θ2) and the third acute angle (θ3) are set to allow the blade (51) to stay in the second position with coming into contact with the supporting surface (15) entirely when the operation point (OP) of the reciprocating linear motion mechanism (38) reaches the terminating position.

[5] The cutting apparatus (1) according to any one of [1] to [4], wherein the blade (51) of the cutting edged tool (5) has the single cutting edge.

[6] The cutting apparatus (1) according to [1], wherein the reinforcement fiber is the carbon fiber, the thermoplastic resin is the polyamide resin, the first acute angle (θ1) is in the range of 50 degrees to 60 degrees, and the second acute angle (θ2) is in the range of 70 degrees to 80 degrees.

[7] The cutting apparatus (1) according to [1] or [2], wherein in a case where the blade (51) is the linear blade, the first connecting portion (31) and the second connecting portion (33) are located on the imaginary straight line (VL4) that is parallel to the linear blade, and the third connecting portion (35) is located between the first connecting portion (31) and the second connecting portion (33) and between the linear blade and the imaginary straight line (VL4).

[8] The operation method for the cutting apparatus according to [1], wherein the reciprocating linear motion mechanism (38) causes the cutting edged tool (5) to reciprocate at the average speed that is five or more times faster than the moving speed of the extruded reinforcement fiber containing kneaded material (13) which is being conveyed on the supporting surface (15) to cut the extruded reinforcement fiber containing kneaded material (13).

INDUSTRIAL APPLICABILITY

According to the invention, the first guide link and the second guide link do not oscillate, and the cutting edged tool can be caused to swing without enlarging the dimensions of the cutting edged tool moving mechanism. In addition, the first to the third connecting portions only move linearly, and therefore, the cutting edged tool can move at high speeds, whereby the cutting edged tool can cut the moving material to be cut without receiving force of a great magnitude from the moving material to be cut. As a result, the deterioration of the cutting edged tool can be suppressed, thereby making it possible to extend the service life of the cutting edged tool. The invention which provides the advantageous effect described above is useful in the field of cutting apparatuses and their operation methods.

REFERENCE SIGNS LIST 1 cutting apparatus
5 cutting edged tool
10 cutting edged tool moving mechanism 11 base
13 extruded reinforcement fiber containing kneaded material (material to be cut)
14 supporting member
15 supporting surface
17 first guide link
18 first slider
19 second guide link
20 second slider
31 first connecting portion
33 second connecting portion
35 third connecting portion
37 electric motor (drive source)
38 reciprocating linear motion mechanism
51 blade
OP operation point

The invention claimed is:

1. A cutting apparatus for cutting an extruded reinforcement fiber containing kneaded material, which has been extruded from an extruding machine and is being moved on a supporting surface, into a predetermined length before a thermoplastic resin is hardened, wherein the extruded reinforcement fiber containing kneaded material is continuously formed by extruding a reinforcement fiber containing kneaded material having fluidity, which has been formed by kneading the thermoplastic resin together with a reinforcement fiber while heating, in an elongated form from the extruding machine, the cutting apparatus comprising:

a cutting edged tool moving mechanism for moving a cutting edged tool having a plate shape and including a blade on an edge portion thereof from a first position, which is located away from the supporting surface and above the extruded reinforcement fiber containing kneaded material, to a second position, at which the blade comes into contact with the supporting surface, and then moving back the cutting edged tool from the second position to the first position so as to cut the extruded reinforcement fiber containing kneaded material which is being moved on the supporting surface with the cutting edged tool, wherein the cutting edged tool moving mechanism comprises:

a first guide link that forms a first guide path extending to form a first acute angle relative to the supporting surface;

a second guide link, which is spaced away in a surface direction of the supporting surface from the first guide link, and which forms a second guide path extending to form a second acute angle, which is greater than the first acute angle, relative to the supporting surface;

a first connecting portion, which is fixed to the cutting edged tool to form a rotational pair rotatable about a first imaginary line intersecting a plate surface of the cutting edged tool at right angles, and which forms a sliding pair with the first guide link;

a second connecting portion, which is fixed to the cutting edged tool to form a rotational pair rotatable about a second imaginary line intersecting the plate surface of the cutting edged tool at right angles, and which forms a sliding pair with the second guide link;

a reciprocating linear motion mechanism whose operation point moves linearly in a reciprocating motion between an initiating position and a terminating position by means of power from a power source; and a third connecting portion that connects the cutting edged tool and the operation point of the reciprocating linear motion mechanism together so as to form a rotational pair rotatable about a third imaginary line intersecting the plate surface of the cutting edged tool at right angles, wherein the first acute angle, the second acute angle and a positional relationship among the first connecting portion to the third connecting portion are set to form an angle between the blade and the supporting surface when the operation point of the reciprocating linear motion mechanism stays in the initiating position and the blade of the cutting edged tool stays in the first position, and to gradually reduce the angle between the blade and the supporting surface with the blade sliding on the supporting surface in the surface direction of the supporting surface and compressing the extruded reinforcement containing kneaded material, which is being moved, in a process in which the cutting edged tool moves towards the second position from the first position as a result of the operation point of the reciprocating linear motion mechanism moving from the initiating position to the terminating position, wherein the cutting apparatus further comprises two vertical frames and two horizontal frames which are fixed to the two vertical frames, wherein the first and second guide links each comprise two guide bars, wherein the two guide bars are fixed individually to the two horizontal frames at both ends thereof, wherein a slider is provided on the two guide bars so as to slide the two guide bars while straddling the two guide bars, and wherein a third acute angle that is formed by a line connecting the initiating position of the operation point and the terminating position of the operation point and the supporting surface is greater than the first acute angle and is smaller than the second acute angle.

2. The cutting apparatus according to claim 1, wherein the first acute angle, the second acute angle and the third acute angle are set to allow the blade to stay in the second position with coming into contact with the supporting surface entirely when the operation point of the reciprocating linear motion mechanism reaches the terminating position.

3. The cutting apparatus according to claim 1, wherein the blade of the cutting edged tool has a single cutting edge.

4. The cutting apparatus according to claim 1, wherein the reinforcement fiber is a carbon fiber, the thermoplastic resin is a polyamide resin, the first acute angle is in the range of 50 degrees to 60 degrees, and the second acute angle is in the range of 70 degrees to 80 degrees.

5. The cutting apparatus according to claim 1, wherein in a case where the blade is a linear blade, the first connecting portion and the second connecting portion are located on a straight fourth imaginary line that is parallel to the linear blade, and the third connecting portion is located between the first connecting portion and the second connecting portion and between the linear blade and the fourth imaginary line.

6. An operation method for the cutting apparatus according to claim 1, wherein the reciprocating linear motion mechanism causes the cutting edged tool to reciprocate at an average speed that is five or more times faster than a moving speed of the extruded reinforcement fiber containing kneaded material which is being conveyed on the supporting surface to cut the extruded reinforcement fiber containing kneaded material.

7. The cutting apparatus according to claim 1, wherein the initiating position overlaps with the motor in an axial direction of the motor.

8. The cutting apparatus according to claim 1, wherein the third connecting portion is movable to a position overlapping with the motor in an axial direction of the motor.

9. A cutting apparatus for cutting a material which is being moved on a supporting surface to be cut, the cutting apparatus comprising:
  a cutting edged tool moving mechanism for moving a cutting edged tool having a plate shape and including a blade on an edge portion thereof from a first position, which is located away from the supporting surface and above the material to be cut, to a second position, at which the whole blade comes into contact with the supporting surface, and then moving back the cutting edged tool from the second position to the first position so as to cut the material to be cut which is being moved on the supporting surface,
  wherein the cutting edged tool moving mechanism comprises:
    a first guide link that forms a first guide path extending to form a first acute angle relative to the supporting surface;
    a second guide link, which is disposed spaced away in a surface direction of the supporting surface from the first guide link, and which forms a second guide path extending to form a second acute angle, which is greater than the first acute angle, relative to the supporting surface;
    a first connecting portion, which is fixed to the cutting edged tool to form a rotational pair rotatable about a first imaginary line intersecting a plate surface of the cutting edged tool at right angles, and which forms a sliding pair with the first guide link;
    a second connecting portion, which is fixed to the cutting edged tool to form a rotational pair rotatable about a second imaginary line intersecting the plate surface of the cutting edged tool at right angles, and which forms a sliding pair with the second guide link;
    a reciprocating linear motion mechanism whose operation point moves linearly in a reciprocating motion between an initiating position and a terminating position by means of power from a power source; and
    a third connecting portion that connects the cutting edged tool and the operation point of the reciprocating linear motion mechanism together so as to form a rotational pair rotatable about a third imaginary line intersecting the plate surface of the cutting edged tool at right angles,
  wherein the first acute angle, the second acute angle and a positional relationship among the first connecting portion to the third connecting portion are set to form an angle between the blade and the supporting surface when the operation point of the reciprocating linear motion mechanism stays in the initiating position and the blade of the cutting edged tool stays in the first position, and to gradually reduce the angle between the blade and the supporting surface with the blade sliding on the supporting surface in the surface direction of the supporting surface in a process in which the cutting edged tool moves towards the second position from the first position as a result of the operation point of the reciprocating linear motion mechanism moving from the initiating position to the terminating position,
  wherein the cutting apparatus further comprises two vertical frames and two horizontal frames which are fixed to the two vertical frames,
  wherein the first and second guide links each comprise two guide bars,
  wherein the two guide bars are fixed individually to the two horizontal frames at both ends thereof,
  wherein a slider is provided on the two guide bars so as to slide the two guide bars while straddling the two guide bars, and
  wherein a third acute angle that is formed by a line connecting the initiating position of the operation point and the terminating position of the operation point and the supporting surface is greater than the first acute angle and is smaller than the second acute angle.

10. The cutting apparatus according to claim 9, wherein the blade of the cutting edged tool has a single cutting edge.

11. The cutting apparatus according to claim 9, wherein in a case where the blade is a linear blade, the first connecting portion and the second connecting portion are located on a straight fourth imaginary line that is parallel to the linear blade, and the third connecting portion is located between the first connecting portion and the second connecting portion and between the linear blade and the fourth imaginary line.

12. A cutting apparatus for cutting an extruded reinforcement fiber containing kneaded material, which has been extruded from an extruding machine and is being moved on a supporting surface, into a predetermined length before a thermoplastic resin is hardened, wherein the extruded reinforcement fiber containing kneaded material is continuously formed by extruding a reinforcement fiber containing kneaded material having fluidity, which has been formed by kneading the thermoplastic resin together with a reinforcement fiber while heating, in an elongated form from the extruding machine, the cutting apparatus comprising:
  a cutting edged tool moving mechanism for moving a cutting edged tool having a plate shape and including a blade on an edge portion thereof from a first position, which is located away from the supporting surface and above the extruded reinforcement fiber containing kneaded material, to a second position, at which the blade comes into contact with the supporting surface, and then moving back the cutting edged tool from the second position to the first position so as to cut the extruded reinforcement fiber containing kneaded material which is being moved on the supporting surface with the cutting edged tool,
  wherein the cutting edged tool moving mechanism comprises:
    a first guide link that forms a first guide path extending to form a first acute angle relative to the supporting surface;
    a second guide link, which is spaced away in a surface direction of the supporting surface from the first guide link, and which forms a second guide path extending to form a second acute angle, which is greater than the first acute angle, relative to the supporting surface;
    a first connecting portion, which is fixed to the cutting edged tool to form a rotational pair rotatable about a first imaginary line intersecting a plate surface of the cutting edged tool at right angles, and which forms a sliding pair with the first guide link;
    a second connecting portion, which is fixed to the cutting edged tool to form a rotational pair rotatable about a second imaginary line intersecting the plate surface of the cutting edged tool at right angles, and which forms a sliding pair with the second guide link;

a reciprocating linear motion mechanism whose operation point moves linearly in a reciprocating motion between an initiating position and a terminating position by means of power from a power source; and a third connecting portion that connects the cutting edged tool and the operation point of the reciprocating linear motion mechanism together so as to form a rotational pair rotatable about a third imaginary line intersecting the plate surface of the cutting edged tool at right angles, wherein the first acute angle, the second acute angle and a positional relationship among the first connecting portion to the third connecting portion are set to form an angle between the blade and the supporting surface when the operation point of the reciprocating linear motion mechanism stays in the initiating position and the blade of the cutting edged tool stays in the first position, and to gradually reduce the angle between the blade and the supporting surface with the blade sliding on the supporting surface in the surface direction of the supporting surface and compressing the extruded reinforcement containing kneaded material, which is being moved, in a process in which the cutting edged tool moves towards the second position from the first position as a result of the operation point of the reciprocating linear motion mechanism moving from the initiating position to the terminating position, and wherein a third acute angle that is formed by a line connecting the initiating position of the operating point and the terminating position of the operation point and the supporting surface is greater than the first acute angle and is smaller than the second acute angle.

* * * * *